United States Patent
Pettersson et al.

(10) Patent No.: US 7,185,950 B2
(45) Date of Patent: Mar. 6, 2007

(54) HEAD RESTRAINT SYSTEM

(75) Inventors: Erik O. Pettersson, Bankeryd (SE); Bernardus W. G. van de Geer, Nol (SE)

(73) Assignee: Fisher Dynamics Corporation, St. Clair Shores, MI (US)

( * ) Notice: Subject to any disclaimer, the term of this patent is extended or adjusted under 35 U.S.C. 154(b) by 0 days.

(21) Appl. No.: 11/316,206

(22) Filed: Dec. 22, 2005

(65) Prior Publication Data

US 2006/0163930 A1 Jul. 27, 2006

Related U.S. Application Data

(60) Provisional application No. 60/639,764, filed on Dec. 28, 2004.

(51) Int. Cl.
- *B60N 2/427* (2006.01)
- *B60N 2/235* (2006.01)
- *B60R 21/00* (2006.01)
- *B60R 21/055* (2006.01)

(52) U.S. Cl. .................. 297/216.12; 297/216.13; 297/216.14; 297/408; 297/409

(58) Field of Classification Search .......... 297/216.12, 297/408, 409, 216.13, 216.14

See application file for complete search history.

(56) References Cited

U.S. PATENT DOCUMENTS

| | | | |
|---|---|---|---|
| 2,984,293 A | 5/1961 | Bontempi et al. | |
| 3,627,379 A | 12/1971 | Faust | |
| 3,655,241 A | 4/1972 | Herzer et al. | 297/408 X |
| 3,922,029 A | 11/1975 | Urai | |
| 3,929,374 A | 12/1975 | Hogan et al. | |
| 3,948,562 A | 4/1976 | Grabner et al. | 297/408 |
| 4,191,422 A | 3/1980 | Inasawa et al. | 297/409 X |
| 4,191,423 A | 3/1980 | Goldner | 297/408 |
| 4,193,631 A | 3/1980 | Hobley et al. | 297/408 |
| 4,285,545 A | 8/1981 | Protze | |
| 4,351,563 A | 9/1982 | Hattori | 297/408 |
| 4,674,797 A | 6/1987 | Tateyama | 297/408 |
| 4,765,683 A | 8/1988 | Hattori | 297/408 X |
| 4,798,415 A | 1/1989 | Tanino et al. | 297/408 X |
| 4,830,434 A | 5/1989 | Ishida et al. | 297/408 |
| 4,840,428 A | 6/1989 | Kobayashi et al. | 297/408 |
| 4,844,544 A | 7/1989 | Ochiai | 297/408 |
| 4,861,107 A | 8/1989 | Vidwans et al. | 297/408 |
| 5,026,120 A | 6/1991 | Takeda et al. | 297/408 |
| 5,181,763 A | 1/1993 | Dellanno et al. | 297/408 X |
| 5,199,765 A | 4/1993 | Garmendia et al. | 297/408 X |
| 5,228,749 A | 7/1993 | Harrell | 297/408 |
| 5,236,245 A | 8/1993 | Harrell | 297/408 |
| 5,236,246 A | 8/1993 | Harrell | 297/408 |
| 5,238,295 A | 8/1993 | Harrell | 297/408 |
| 5,290,091 A | 3/1994 | Dellanno et al. | 297/408 X |
| 5,378,043 A | 1/1995 | Viano et al. | 297/216.12 X |
| 5,590,933 A | 1/1997 | Andersson | 297/408 |

(Continued)

*Primary Examiner*—Rodney B. White
(74) *Attorney, Agent, or Firm*—Harness, Dickey & Pierce, P.L.C.

(57) ABSTRACT

A head restraint assembly may include a head restraint, a cam, and an arm. The head restraint may be rotatably supported by a seat back and configured to be automatically rotated as the seat back is rotated. The cam may be rotatably coupled to the seat back and include an engagement surface. The arm may include a first portion non-rotatably coupled to the head restraint and a second portion engaged with the cam engagement surface.

32 Claims, 12 Drawing Sheets

U.S. PATENT DOCUMENTS

| | | | |
|---|---|---|---|
| 5,642,918 A | 7/1997 | Sakamoto et al. | 297/408 |
| 5,660,441 A | 8/1997 | Nagayasu et al. | 297/408 |
| 5,664,841 A | 9/1997 | Dal Monte | 297/408 |
| 5,667,275 A | 9/1997 | Takeda | 297/408 |
| 5,669,667 A | 9/1997 | Schmidt | 297/408 |
| 5,681,079 A | 10/1997 | Robinson | 297/408 X |
| 5,683,141 A | 11/1997 | Wakamatsu et al. | 297/408 |
| 5,700,057 A | 12/1997 | De Filippo | 297/408 |
| 5,738,412 A | 4/1998 | Aufrere et al. | 297/408 |
| 5,765,918 A | 6/1998 | Wakamatsu et al. | 297/408 |
| 5,795,019 A | 8/1998 | Wieclawski | 297/216.12 |
| 5,820,211 A | 10/1998 | Heilig et al. | 297/216.12 |
| 5,823,619 A | 10/1998 | Heilig et al. | 297/216.12 |
| 5,836,648 A | 11/1998 | Karschin et al. | 297/216.12 |
| 5,842,738 A | 12/1998 | Knoll et al. | 297/216.12 |
| 5,882,071 A | 3/1999 | Fohl | 297/216.12 |
| 5,895,090 A | 4/1999 | Farquhar et al. | |
| 5,927,804 A | 7/1999 | Cuevas | 297/216.12 |
| 5,934,750 A | 8/1999 | Fohl | 297/216.12 |
| 5,938,279 A | 8/1999 | Schubring et al. | 297/216.12 |
| 6,000,760 A | 12/1999 | Chung | 297/408 |
| 6,019,424 A | 2/2000 | Ruckert et al. | 297/216.12 |
| 6,024,405 A | 2/2000 | MacAndrew et al. | 297/216.12 |
| 6,024,406 A | 2/2000 | Charras et al. | |
| 6,033,017 A | 3/2000 | Elqadah et al. | 297/408 X |
| 6,033,018 A | 3/2000 | Fohl | 297/216.12 X |
| 6,022,078 A | 4/2000 | Chang | |
| 6,045,181 A | 4/2000 | Ikeda et al. | 297/216.12 |
| 6,074,010 A | 6/2000 | Takeda | 297/408 |
| 6,074,011 A | 6/2000 | Ptak et al. | 297/408 |
| 6,135,561 A | 10/2000 | Kruger et al. | 297/216.12 X |
| 6,176,543 B1 | 1/2001 | Nawata et al. | |
| 6,179,379 B1 | 1/2001 | Andersson | 297/216.12 X |
| 6,199,947 B1 | 3/2001 | Wiklund | 297/216.12 |
| 6,250,714 B1 | 6/2001 | Nakano et al. | 297/216.12 X |
| 6,273,511 B1 | 8/2001 | Wieclawski | 297/216.12 X |
| 6,290,298 B1 | 9/2001 | Lee | 297/408 |
| 6,302,485 B1 | 10/2001 | Nakane et al. | 297/408 |
| 6,312,050 B1 | 11/2001 | Eklind | |
| 6,340,206 B1 | 1/2002 | Andersson et al. | 297/216.12 X |
| 6,354,659 B1 | 3/2002 | Andersson et al. | 297/216.12 X |
| 6,364,414 B1 | 4/2002 | Specht | 297/408 X |
| 6,390,558 B2 | 5/2002 | Fischer et al. | |
| 6,419,322 B2 | 7/2002 | Nakane et al. | 297/408 |
| 6,478,373 B1 | 11/2002 | Hake et al. | 297/216.12 X |
| 6,485,096 B1 | 11/2002 | Azar et al. | 297/408 X |
| 6,499,805 B2 | 12/2002 | Watadani | 297/408 |
| 6,511,130 B2 | 1/2003 | Dinkel et al. | 297/408 X |
| 6,520,577 B2 | 2/2003 | Kitagawa | |
| 6,523,892 B1 | 2/2003 | Kage et al. | |
| 6,550,865 B2 | 4/2003 | Cho | 297/408 |
| 6,557,933 B1 | 5/2003 | Schambre et al. | |
| 6,565,150 B2 | 5/2003 | Fischer et al. | 297/408 |
| 6,568,753 B1 | 5/2003 | Watanabe | 297/216.12 |
| 6,604,788 B1 | 8/2003 | Humer | 297/216.12 |
| 6,612,653 B2 | 9/2003 | Takata | 297/408 |
| 6,631,949 B2 | 10/2003 | Humer et al. | 297/216.12 |
| 6,631,955 B2 | 10/2003 | Humer et al. | 297/216.12 |
| 6,655,733 B2 | 12/2003 | Humer et al. | 297/216.12 |
| 6,663,181 B2 | 12/2003 | Nygren et al. | 297/408 |
| 6,702,377 B2 | 3/2004 | Nakano | 297/216.12 |
| 6,702,385 B2 | 3/2004 | Holdampf et al. | 297/408 |
| 6,709,051 B2 | 3/2004 | Schambre et al. | |
| 6,726,283 B2 | 4/2004 | Schambre et al. | 297/408 X |
| 6,746,078 B2 | 6/2004 | Breed | 297/216.12 |
| 6,749,256 B1 | 6/2004 | Klier et al. | 297/216.12 |
| 6,767,064 B2 | 7/2004 | Veine et al. | |
| 6,779,840 B1 | 8/2004 | Farquhar et al. | 297/216.12 |
| 6,783,177 B1 | 8/2004 | Nakano | 297/216.12 |
| 6,789,845 B2 | 9/2004 | Farquhar et al. | 297/216.12 |
| 6,789,846 B2 | 9/2004 | Humer et al. | 297/216.12 |
| 6,802,562 B1 | 10/2004 | Hake et al. | 297/216.12 |
| 6,824,212 B2 | 11/2004 | Malsch et al. | 297/216.12 |
| 6,899,395 B2 * | 5/2005 | Yetukuri et al. | 297/408 |
| 6,983,989 B1 * | 1/2006 | Veine et al. | 297/216.12 |
| 7,044,544 B2 * | 5/2006 | Humer et al. | 297/216.12 |
| 7,077,472 B2 * | 7/2006 | Steffens, Jr. | 297/216.13 |
| 2001/0038233 A1 | 11/2001 | Eklind | |
| 2001/0040396 A1 | 11/2001 | Kreuels et al. | 297/216.12 |
| 2002/0043858 A1 | 4/2002 | Svantesson et al. | |
| 2002/0053819 A1 | 5/2002 | Itoh | |
| 2002/0074843 A1 | 6/2002 | Malsch et al. | 297/408 |
| 2002/0079723 A1 | 6/2002 | Risch et al. | |
| 2002/0084686 A1 | 7/2002 | Takata | 297/408 |
| 2002/0093231 A1 | 7/2002 | Estrada et al. | 297/216.12 |
| 2002/0113483 A1 | 8/2002 | Fischer et al. | 297/408 |
| 2002/0195846 A1 | 12/2002 | Masuda et al. | 297/216.12 |
| 2003/0001414 A1 | 1/2003 | Humer et al. | 297/216.12 |
| 2003/0011224 A1 | 1/2003 | Humer et al. | 297/216.12 |
| 2003/0015897 A1 | 1/2003 | Humer et al. | 297/216.12 |
| 2003/0030316 A1 | 2/2003 | Cho | 297/216.12 |
| 2003/0122410 A1 | 7/2003 | Fischer et al. | 297/216.12 |
| 2003/0160481 A1 * | 8/2003 | Veine et al. | 297/216.12 |
| 2004/0012234 A1 | 1/2004 | Yamaguchi et al. | 297/216.12 |
| 2004/0017099 A1 | 1/2004 | O'Connor | |
| 2004/0036340 A1 | 2/2004 | Imayou et al. | 297/408 |
| 2004/0061362 A1 | 4/2004 | Farquhar et al. | 297/216.12 |
| 2004/0070240 A1 | 4/2004 | Haland et al. | 297/216.12 |
| 2004/0100133 A1 | 5/2004 | Wieclawski | 297/216.12 |
| 2004/0108766 A1 | 6/2004 | Baker et al. | 297/408 |
| 2004/0113479 A1 | 6/2004 | Jost | |
| 2004/0113480 A1 | 6/2004 | Reed et al. | 297/408 |
| 2004/0119324 A1 | 6/2004 | Humer et al. | 297/216.12 |
| 2004/0145223 A1 | 7/2004 | Lee | 297/216.12 |
| 2004/0155496 A1 | 8/2004 | Farquhar et al. | 297/216.12 |
| 2004/0160094 A1 | 8/2004 | Flogard | 297/216.12 |
| 2004/0174053 A1 | 9/2004 | Schmale | 297/216.12 |
| 2004/0195872 A1 | 10/2004 | Svantesson | 297/216.12 |
| 2004/0195894 A1 | 10/2004 | Pal et al. | |
| 2004/0195895 A1 | 10/2004 | Sedlatschek et al. | 297/408 |
| 2004/0239160 A1 | 12/2004 | Thunnissen et al. | 297/216.12 |
| 2004/0245813 A1 | 12/2004 | Steffens, Jr. | 297/216.1 |
| 2004/0245814 A1 | 12/2004 | Lee | 297/216.12 |
| 2004/0245833 A1 | 12/2004 | Svantesson | 297/408 |

* cited by examiner

HEAD RESTRAINT SYSTEM

CROSS-REFERENCE TO RELATED APPLICATIONS

This application claims the benefit of U.S. Provisional Application No. 60/639,764, filed on Dec. 28, 2004. The disclosure of the above application is incorporated herein by reference.

FIELD

The present disclosure relates to seat assemblies, and more particularly, to an improved head restraint assembly for use with a seat assembly.

BACKGROUND

In vehicle design, occupant safety is becoming increasingly important. To that end, vehicle safety systems and vehicle structure play a significant role. As a general proposition, when a moving vehicle is abruptly stopped (i.e., from contact with a stationary object or another vehicle), the forward and/or rearward momentum and associated forces are transferred to the vehicle occupants by way of vehicle structure and associated components. To minimize the effects of such forces on vehicle occupants, vehicle safety systems work in conjunction with energy management devices to transfer energy generated by the vehicle impact generally to the structure of the vehicle and away from the vehicle occupants.

Safety systems commonly work in conjunction with vehicle structure to transfer impact forces and divert the associated energy away from the vehicle occupants and into the vehicle structure. Modern vehicle safety systems commonly include a variety of energy management devices such as seatbelts and airbags to help protect a passenger in the event of an impact or accident. Such systems are typically designed to work together with sensors and other structural elements such as door beams, side sill sections, and body panels to improve overall vehicle safety and provide the best possible protection for vehicle occupants. More particularly, such systems act to gradually decelerate the occupants with the vehicle structure to dissipate the forces away from the occupants and into the vehicle structure.

Such impact forces are commonly absorbed by the vehicle structure through deformation of steel and other structural components. In an effort to effectively transmit impact forces to the vehicle structure, vehicle safety systems are implemented to safely transmit the force from a moving occupant (i.e., an occupant moving forward and/or rearward relative to a vehicle structure) to the vehicle structure via an energy management device such as a seatbelt or an airbag. More particularly, the forces associated with an occupant moving relative to the vehicle are safely and controllably transmitted to the vehicle structure via a seatbelt or an airbag such that the structure, as opposed to the occupant, can manage the energy.

Energy management devices, such as airbags and seatbelts, are commonly designed for use in conjunction with one another to transfer impact forces to the associated vehicle structure. Airbags transmit a force received by a moving occupant to the vehicle structure, while seatbelts transmit similar forces to the vehicle structure via a vehicle floor pan or vehicle seat, depending on the particular application. As can be appreciated, such vehicle seats receive the impact force from one or both of the airbag and seatbelt to dissipate energy safely to the vehicle structure, thereby protecting the vehicle occupants.

In addition to the aforementioned safety systems, vehicle seats also play a significant role in occupant protection. As can be appreciated, vehicle seats are commonly designed to work with safety systems and energy management devices to divert impact forces into the vehicle structure and away from vehicle occupants.

Conventional seat assemblies commonly include a seatback pivotably supported by a seat bottom and a recliner mechanism. The recliner mechanism is disposed generally between the seatback and the seat bottom and selectively positions the seatback relative to the seat bottom. In this manner, the ability of the seatback to absorb and transfer forces to a vehicle structure includes at least two components. First, the overall strength of the seatback structure should be of sufficient rigidity to receive a force from an occupant and transfer the associated force to the vehicle structure, and second, the recliner mechanism should be able to transmit such forces from the seatback to the seat bottom, which may include a cushion and an adjuster, and associated vehicle structure. In this regard, interaction between the occupant and the seatback plays a role in energy management during an impact event.

To ensure adequate engagement with a vehicle occupant, conventional vehicle seats commonly include a head restraint assembly. Typical head restraint assemblies are disposed at an opposite end of the seatback from the recliner mechanism and support the occupant's head during a rearward and/or rearward offset impact event. Such head restraint assemblies typically provide the occupant with the ability to adjust the position of the head restraint relative to the seatback, so as to provide each individual occupant with a desirable safe and comfortable head restraint position.

Today's design accommodates both tall and short persons. If a head restraint supports tall persons with an angled seat back then short persons with a more vertical seat back angle will have the head restraint pushing their head forward. The distance between a person's head and the head restraint is an important cause of whiplash injuries.

As can be appreciated, such an adjustment provides the occupant with the ability to adjust the head restraint so as to increase the safety criteria and comfort of the seat assembly under normal driving conditions both axially (i.e., up and down) and in a fore-aft direction. In addition, the head restraint assembly provides the occupant with a constantly safe and comfortable head to head restraint distance in response to all rotation or reclining positions of the seatback relative to the seat bottom.

An automatic forward adjustment of the head restraint upon rearward recline of the seatback and an automatic rearward adjustment of the head restraint upon forward recline of the seatback relative to the seat bottom helps to ensure that the occupant's head is in close proximity to the head restraint at all times for both tall and short occupants. Specifically, during a rearward impact situation, automatic positioning of the head restraint in such a fashion creates an immediate support of the occupant's head which will reduce and/or eliminate neck injuries during a rearward impact situation, as well as provide the occupant with a more comfortable driving position. Under a rear impact event, positioning the head restraint in proximity to the occupant's head encourages the occupant to engage the head restraint shortly after the initial impact, thereby quickly and efficiently transmitting the impact energy from the occupant's head into the vehicle seat. As previously discussed, such energy management allows the seat assembly and associated vehicle structure to dissipate the impact force and protect the occupant.

SUMMARY

A head restraint assembly may include a head restraint, a cam, and an arm. The head restraint may be rotatably supported by a seat back and configured to be automatically rotated as the seat back is rotated. The cam may be rotatably coupled to the seat back and include an engagement surface. The arm may include a first portion non-rotatably coupled to the head restraint and a second portion engaged with the cam engagement surface.

Further areas of applicability will become apparent from the description provided herein. It should be understood that the description and specific examples are intended for purposes of illustration only and are not intended to limit the scope of the claims.

DRAWINGS

The drawings described herein are for illustration purposes only and are not intended to limit the scope of the claims.

DETAILED DESCRIPTION

The following description is merely exemplary in nature and is not intended to limit the present disclosure, application, or uses.

Figure 1:
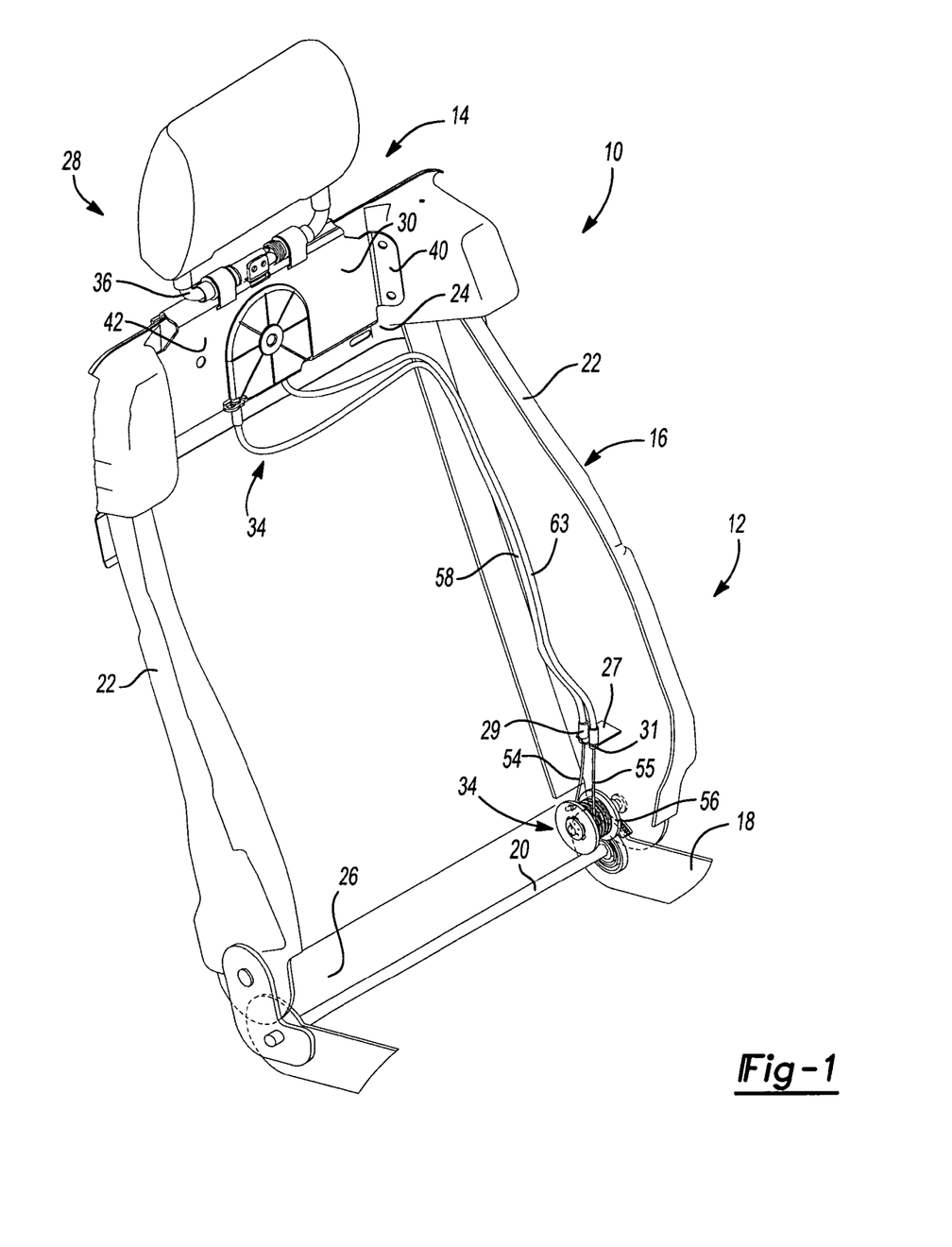
FIG. 1 is a perspective view of a seat assembly including a head restraint assembly of the present disclosure.

With reference to FIG. 1, a seat assembly 10 is provided and may include a seat frame 12 and a head restraint assembly 14. The seat frame 12 may include a seat back frame portion 16 and a seat bottom frame portion 18. The seat back frame portion 16 may be rotatably mounted to the seat bottom frame portion 18 by a cross bar 20. The seat back frame portion 16 may include a pair of side supports 22, a top crossbar 24, and a lower crossbar 26. Side supports 22 may include a mounting flange 27 having apertures 29, 31 therethrough. The head restraint assembly 14 may be coupled to the seat back frame portion 16.

Figure 2:
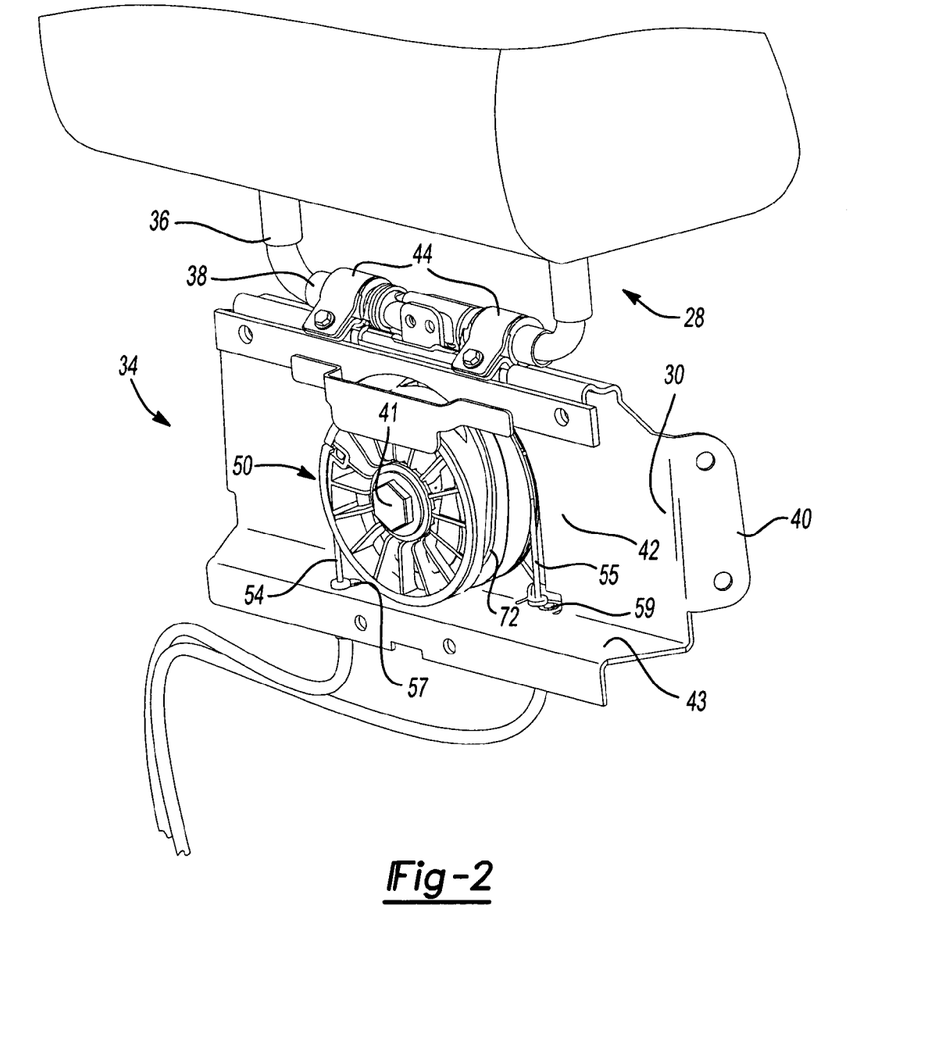
FIG. 2 is a perspective view of the head restraint assembly of FIG. 1.
Figure 3:
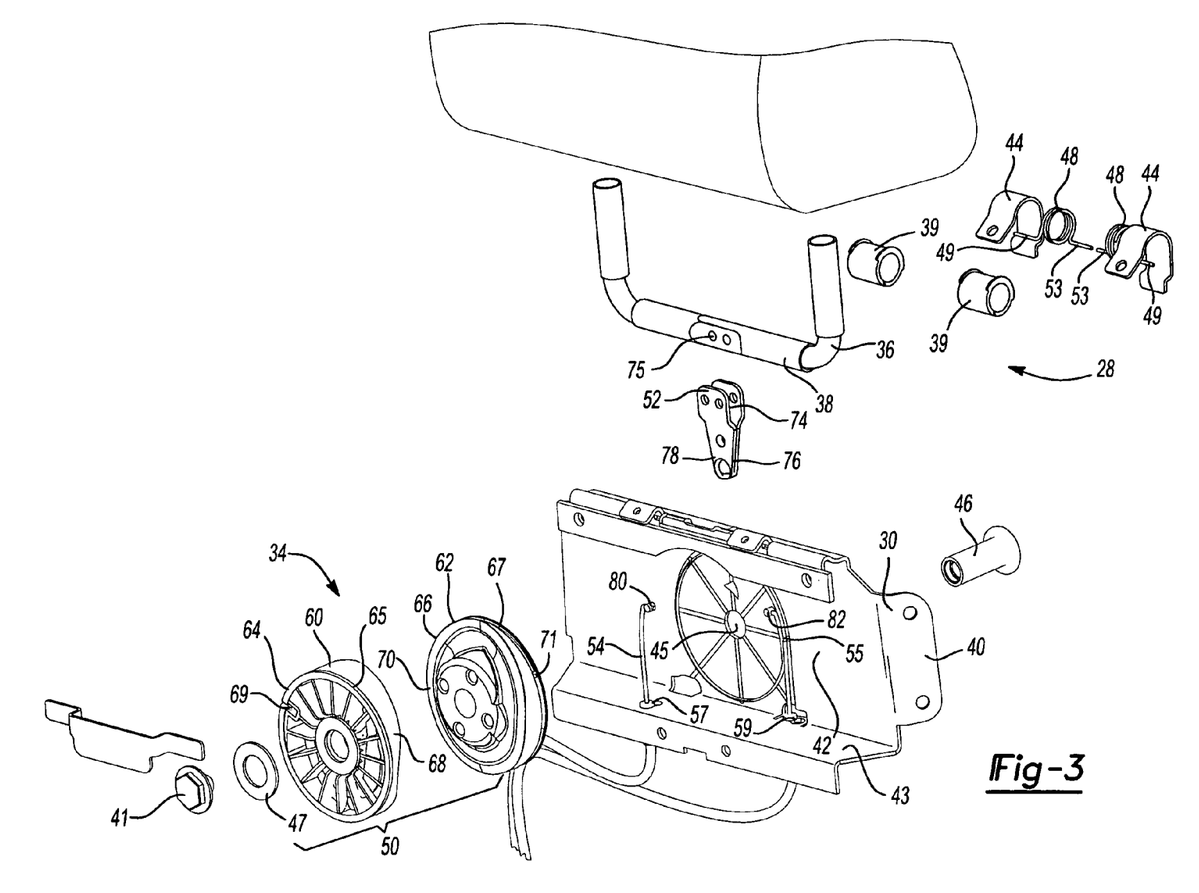
FIG. 3 is an exploded view of the head restraint assembly of FIG. 1.

With additional reference to FIGS. 2 and 3, the head restraint assembly 14 may include a head restraint 28 and a housing 30. The head restraint 28 may be adjustable relative to the housing 30 by an adjustment mechanism 34 to provide angular adjustment of the head restraint 28 relative to the housing 30. The housing 30 may be fixedly coupled to the seat back frame portion 16 at top crossbar 24.

The head restraint 28 may include a generally tubular structure 36 having an engagement surface 38. The head restraint 28 may be supported by the housing 30 generally at the engagement surface 38 such that the head restraint 28 is rotatable relative to the housing 30 about engagement surface 38. The engagement surface 38 may include bushings 39 thereon.

The housing 30 may include a pair of flanges 40, a main body 42 extending generally between the flanges 40, and a pair of upper support members 44. Flanges 40 may be fixedly coupled to top crossbar 24. The main body 42 may include an aperture 45 disposed generally between the flanges 40 and having a post 46 therein for rotatably supporting the adjustment mechanism 34. The main body 42 may include a lower portion 43 extending generally outwardly. The lower portion 43 may include apertures 57, 59. The upper support members 44 may receive bushings 39 mounted on engagement surface 38 of the head restraint 28 such that the head restraint 28 is rotatable relative to the housing 30 about engagement surface 38. Torsional springs 48 may be coupled to upper support members 44 at first ends 49 and engage arm 52 at second ends 53 (discussed below), biasing head restraint 28 in a rearward position.

The adjustment mechanism 34 may include a cam 50, an arm 52, cables 54, 55, and a spool 56. The cam 50 may be rotatably supported by post 46 and include front and rear cam portions 60, 62. The front and rear cam portions 60, 62 may be separate pieces coupled together by post 46, fastener 41, and washer 47.

Front and rear cam portions 60, 62 may each have generally circular main bodies 64, 66 including cable grooves 65, 67 therein. Cable retention recesses 69, 71 may be located along cable grooves 65, 67 and generally couple front and rear cams 60, 62 to cables 54, 55. Front and rear cams 60, 62 may also include cam surfaces 68, 70 thereon. When coupled together, front and rear cams 60, 62 may form a groove 72 therebetween. The groove 72 may form a serpentine path around the circumference of the cam 50.

A first end 74 of arm 52 may be fixedly coupled to head restraint 28 at head restraint flange 75. Arm 52 may include a reaction portion 76 at a second end 78. First end 74 may engage second end 53 of torsional springs 48, thereby biasing arm 52, and therefore head restraint 28, to a rearward position. The reaction portion 76 may be slidably engaged with cam groove 72 such that rotation of the cam 50 causes the reaction portion 76 of the arm 52 to traverse the cam groove 72. As a result of the serpentine path of the cam groove 72, a force may be applied to arm 52 by cam surfaces 68, 70 as the cam 50 rotates, thereby causing arm 52 to rotate relative to housing 30. Rotation of arm 52 may cause concurrent rotation of head restraint 28, since head restraint 28 may be fixedly coupled to arm 52. Therefore, rotation of cam 50 may provide angular adjustment of head restraint 28 relative to housing 30, as discussed below.

A first cable 54 may be fixed to the front cam 60 at a first end 80 engaged with cable retention recess 69. A second cable 55 may be fixed to the rear cam 62 at a first end 82 engaged with cable retention recess 71. A first cable sleeve 58 may be disposed around a central portion of first cable 54 and a second cable sleeve 63 may be disposed around a central portion of second cable 55. First and second cable sleeves 58, 63 may be fixed to mounting flange 27 at a first end and to housing lower portion 43 at a second end. Cables 54, 55 may pass through apertures 29, 31 in mounting flange 27 and apertures 57, 59 in housing lower portion 43.

Cables 54, 55 may be generally aligned with cable grooves 65, 67 such that a force applied to the cables 54, 55 causes the cam 50 to rotate about post 46 and cables 54, 55 to wind and unwind around grooves 65, 67. Cables 54, 55 may generally be arranged opposite one another, such that as cable 54 is wound around cable groove 65, cable 55 is unwound from cable groove 67. Cables 54, 55 may therefore generally provide rotational forces opposite one another, thereby holding cam 50 in a desired position until a force is applied to one of the cables 54, 55 via spool 56.

Figure 4:
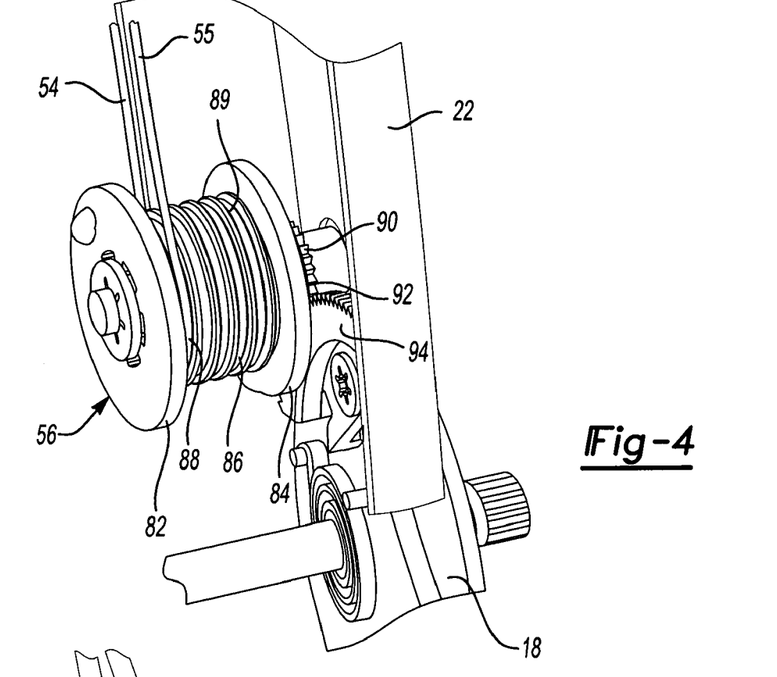
FIG. 4 is a perspective view showing the spool of the head restraint assembly of FIG. 1.

With additional reference to FIG. 4, cables 54, 55 may be controlled by spool 56. Spool 56 may be rotatably mounted to frame side support 22. Spool 56 may include first and second ends 82, 84 and a number of cable grooves 86. A second end 88 of second cable 55 may be fixed to spool 56 near first end 82 and a second end 89 of first cable 54 may be fixed to spool 56 near second end 84. Cables 54, 55 may generally be aligned with cable grooves 86. Cables 54, 55 may generally be arranged opposite one another, such that as cable 54 is wound around cable groove 86, cable 55 is unwound from cable groove 86. Spool 56 may further include a gear portion 90 near second end 84. The gear portion 90 may be a generally circular member having a plurality of teeth 92 configured to drive rotation of spool 56 when engaged by a second gear.

Figure 5:
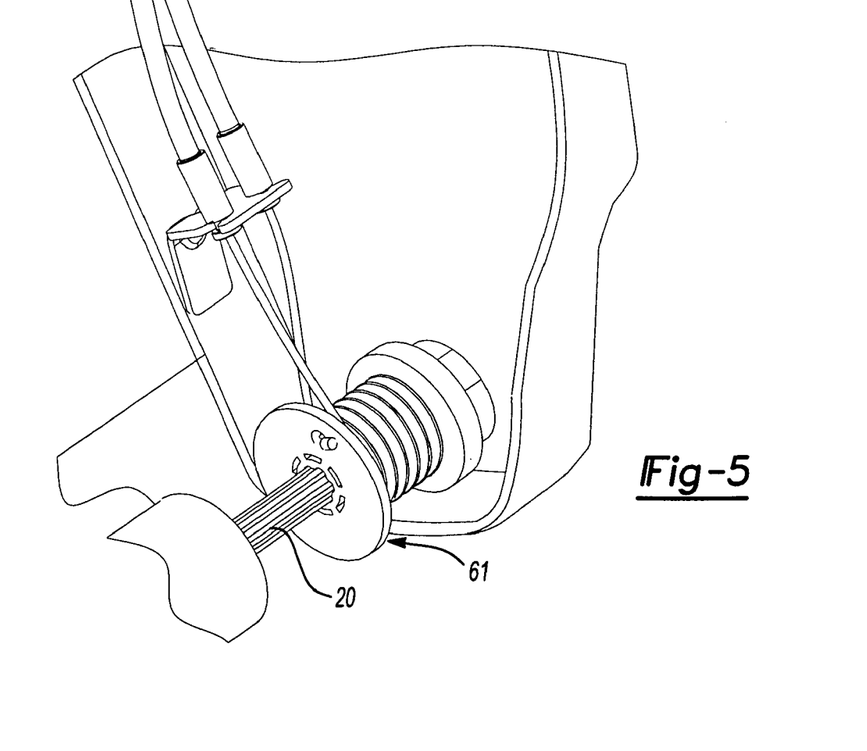
FIG. 5 is a perspective view showing an additional attachment location for the spool of FIG. 4.

Spool 56 can be driven by a larger diameter stationary gear 94. Stationary gear 94 may be fixedly mounted to seat bottom frame portion 18. The ratios between the diameters of spool gear portion 90 and stationary gear 94 can be arranged any number of ways to provide a variety of head restraint and seat back recline angles. While described as being driven by stationary gear 94, it is understood that a spool 61 could be configured for manual rotation as well, as seen in FIG. 5, where spool 61 is coupled to crossbar 20. Alternatively, spool 56 or 61 may be replaced with electrical sensing equipment. The equipment may replace cables 54, 55 with electrical signals to an electrical motor driving arm 52 and rotating head restraint 28.

Figures 6, 7:
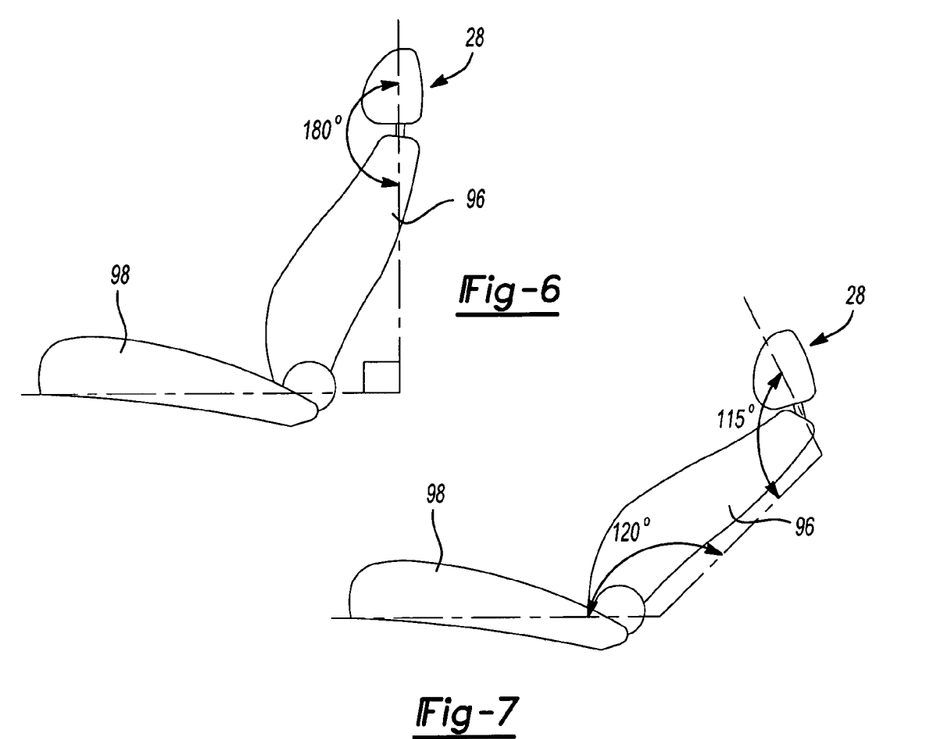
FIG. 6 is a side view of the seat assembly of FIG. 1 including a seat back and a seat bottom in an upright position.
FIG. 7 is a side view of the seat assembly of FIG. 6 in a reclined position.
Figure 8:
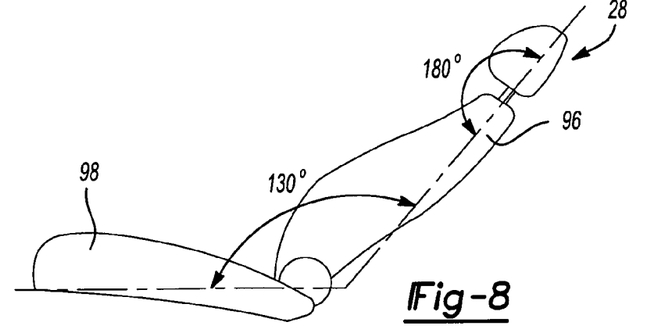
FIG. 8 is a side view of the seat assembly of FIG. 6 in a sleep position.
Figure 9:
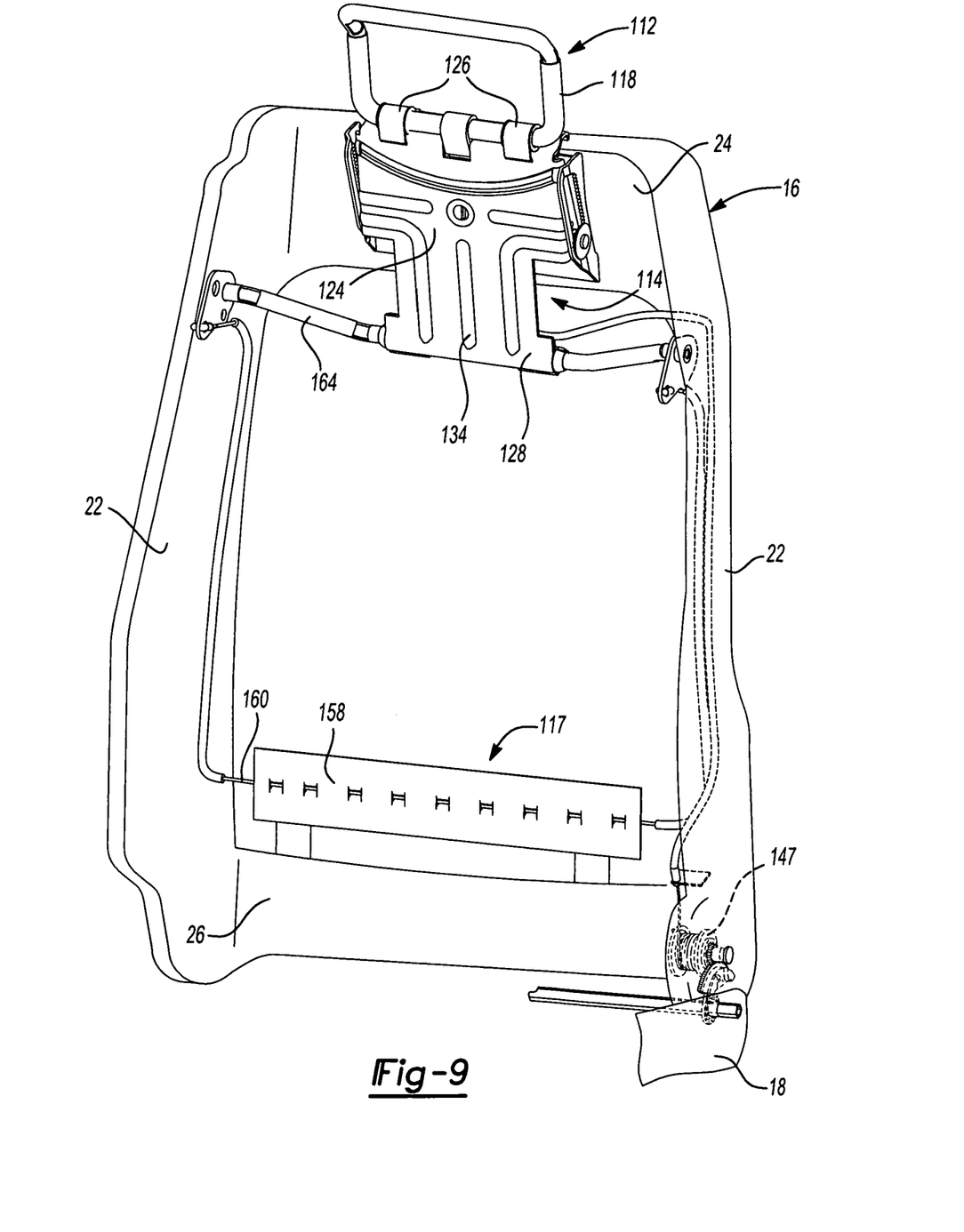
FIG. 9 is a perspective view of a seat assembly including an additional head restraint assembly of the present disclosure.
Figure 10:
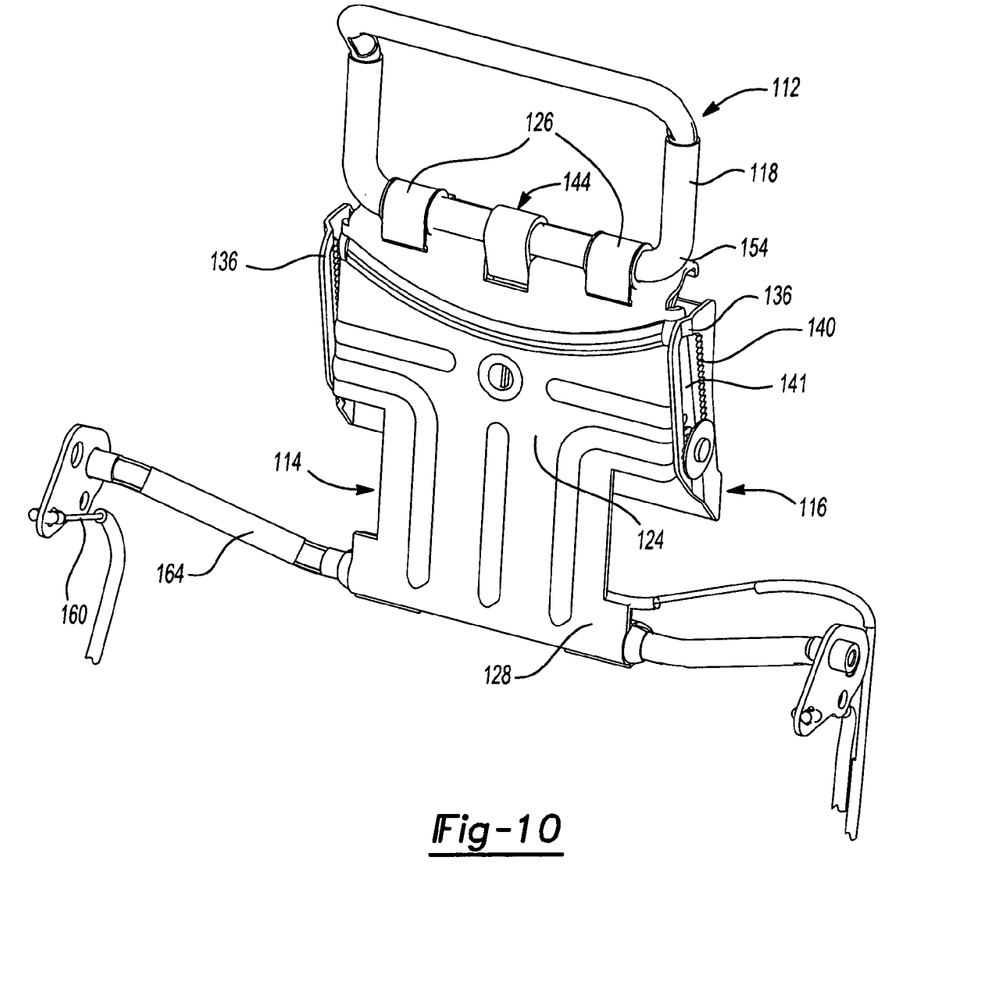
FIG. 10 is a perspective view of the front of the head restraint assembly of FIG. 9 with the housing in a first position.
Figure 11:
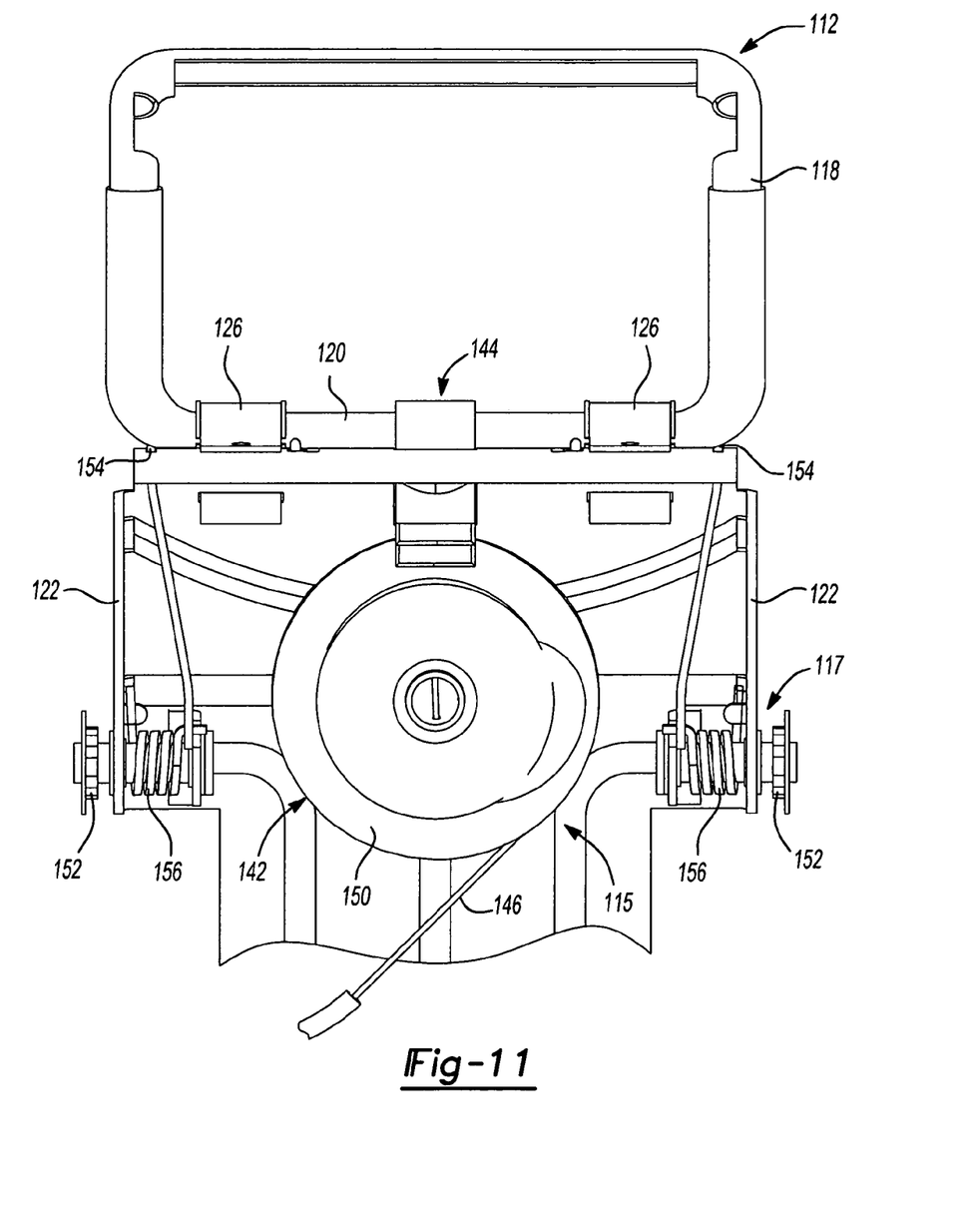
FIG. 11 is a perspective view of the rear of the head restraint assembly of FIG. 9 with the housing in a first position.

Operation of the head restraint assembly 14 will now be described with additional reference to FIGS. 6–8. FIGS. 6–8 show seat frame 12 having a seat back 96 coupled to seat back frame portion 16 and a seat bottom 98 attached to seat bottom frame portion 18. The seat back 96 may be adjustable relative to the seat bottom 98 to provide a plurality of recline positions for seat back 96. The head restraint assembly 14 may be similarly adjustable relative to seat back 96 through actuation of the adjustment mechanism 34 to position the head restraint 28 in a desired position.

As seen in FIG. 7, when the seat back 96 is rotated into a reclined position, the head restraint 28 may be rotated forward to ensure that an occupant's head is within a safe distance of head restraint 28 when using the seat assembly 10. To rotate the head restraint 28, a force may be applied to cables 54, 55 of the adjustment mechanism 34 via spool 56 to thereby rotate the cam 50 relative to the housing 30. Rotation of the cam 50 relative to the housing 30 may cause the arm 52 to traverse the cam groove 72, as previously discussed. If the seat back 96 is moved into a reclined position, the arm 52 may engage cam surfaces 68, 70 such that the arm 52 is rotated relative to the housing 30 and the head restraint 28 is rotated forward. If the seat back 96 is rotated into a forward position, the arm 52 may engage cam surfaces 68, 70 such that the arm 52 is rotated rearward. Therefore, as the seat back 96 is reclined, adjustment mechanism 34 may cause the head restraint 28 to rotate forward, while forward rotation of the seat back 96 relative to the seat bottom 98 may cause adjustment mechanism 34 to rotate the head restraint 28 rearward in an effort to maintain a desired safe distance between the head restraint 28 and the occupant's head.

However, when seat back 96 is rotated rearward beyond the reclined position to a sleeping position, shown in FIG. 8, arm 52 may engage cam surfaces 68, 70, causing the head restraint 28 to be rotated rearward and generally aligned with the seat back 96 in a manner similar to that when the seat back 96 is in an upright position.

Examples of the various seat back 96 and head restraint 28 orientations are shown in FIGS. 6–8. FIG. 6 shows a vehicle seat back 96 in a generally upright position, having an angle of generally 90 degrees between the seat back 96 and seat bottom 98 and an angle of generally 180 degrees between the head restraint 28 and the seat back 96. FIG. 7 shows a vehicle seat back 96 in a first reclined position, having an angle of generally 120 degrees between the seat back 96 and seat bottom 98 and an angle of generally 115 degrees between the head restraint 28 and the seat back 96. FIG. 8 shows a vehicle seat back 96 in a second reclined position, or sleeping position, having an angle of generally 130 degrees between the seat back 96 and seat bottom 98 and an angle of generally 180 degrees between the head restraint 28 and the seat back 96. As FIGS. 6–8 illustrate, as the seat back 96 is reclined, the head restraint 28 may be rotated forward for a specified angular travel and then rotated rearward to accommodate a sleeping position. This may be achieved automatically through an engagement between spool gear portion 90 and stationary gear 94.

As seat back 96 is rotated about seat bottom 98, spool gear portion 90 may cause spool gear 56 to rotate forward or rearward with seat back 96 due to the gear engagement. While specific angular displacements have been noted above, it is understood that any number of combinations are possible by varying spool gear portion 90, stationary gear 94 and/or the serpentine path of cam groove 72 (and therefore cam surfaces 68, 70). It is also understood that while described above in the context of a spool, gear, and cable arrangement, the movement of head restraint 28 with seat back 96 may also be accomplished through the use of electric motors and sensors.

With reference to FIGS. 9–12, an additional head restraint assembly 110 is provided and may include a head restraint 112, a housing 114, and a rack 116. The head restraint 112 may be adjustable relative to the housing 114 by an adjustment mechanism 115 to provide angular adjustment of the head restraint 112 relative to the housing 114. In addition, the housing 114 may be slidable relative to the rack 116 by an actuation mechanism 117 to provide both angular and up/down adjustment of the head restraint 112 relative to the rack 116.

The head restraint 112 may include a generally tubular structure 118 having an engagement surface 120. The head restraint 112 may be supported by the housing 114 generally at the engagement surface 120 such that the head restraint 112 is rotatable relative to the housing 114 about surface 120.

The housing 114 may include a pair of flanges 122, a main body 124 extending generally between the flanges 122, a pair of upper support members 126, and a lower bracket 128. The main body 124 may include a post 130 disposed generally between the flanges 122 for rotatably supporting the adjustment mechanism 115 and a plurality of ribs 134 for strengthening the housing 114. The upper support members 126 may be formed opposite the lower bracket 128 and receive surface 120 of the head restraint 112 such that the head restraint 112 is rotatable relative to the housing 114 about surface 120.

Figure 12:
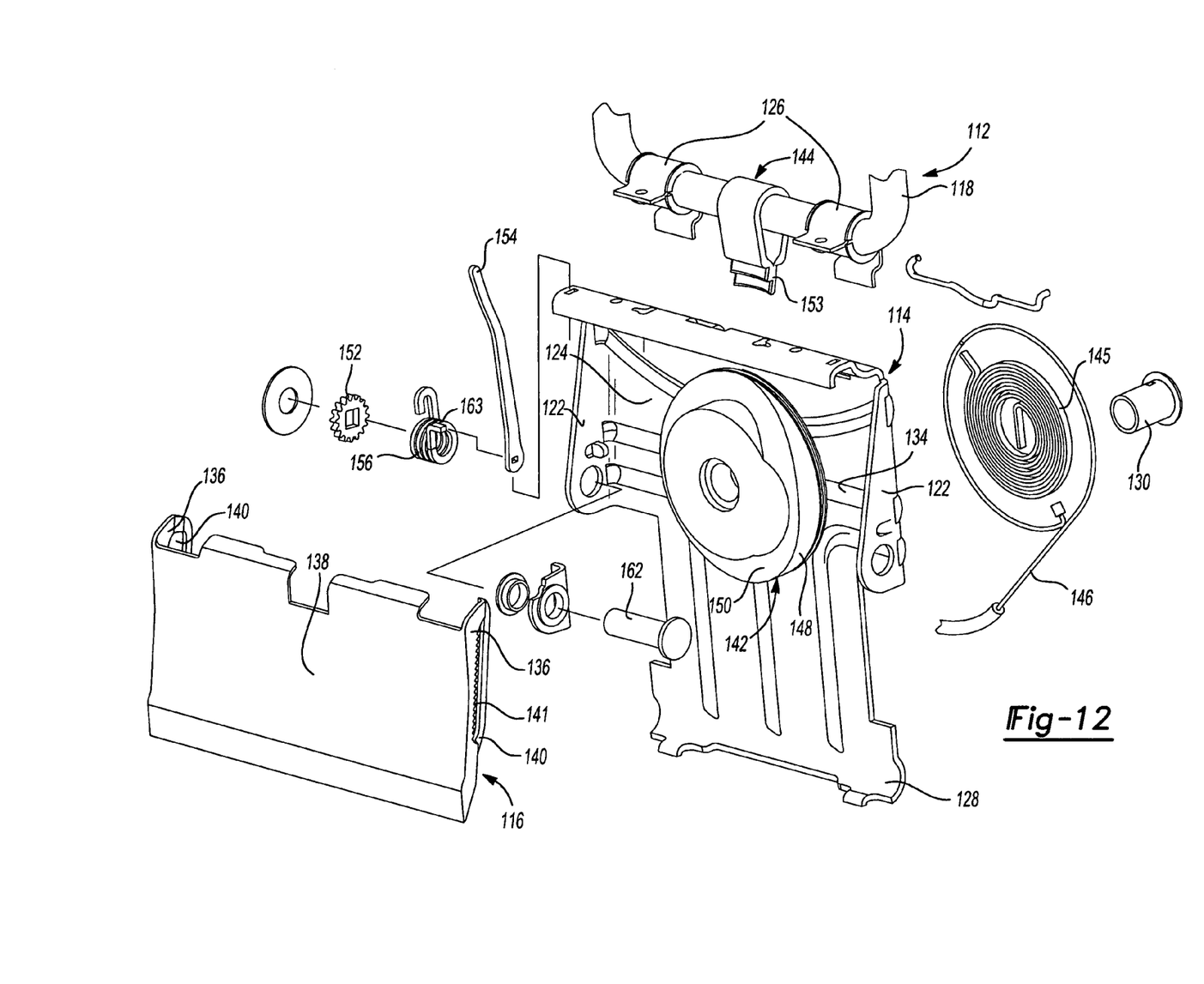
FIG. 12 is an exploded view of the head restraint assembly of FIG. 9.

The rack 116 may include a pair of flanges 136 and a main body 138 extending generally between the flanges 136. The flanges 136 may be formed on opposite sides of the main body 138, with each flange 136 having a slot 140 formed therein. The flanges 136 may be formed substantially perpendicular to the main body 138 such that the slots 140 extend in a parallel relationship to one another and are co-axially aligned. In addition, each slot 140 may be formed at an angle relative to each flange 136 and may include a plurality of teeth 141 for interaction with the actuation mechanism 117, as will be described below.

The adjustment mechanism 115 may include a cam 142, an arm 144, a cable 146 and a spool 147. The cam 142 may be rotatably supported by the post 130 and may include a circular main body 148 having a cam surface 150. A first end of cable 146 may be fixed to the cam 142 such that a force applied to the cable 146 may cause the cam 142 to rotate about post 130 and against a bias of a coil spring 145. The arm 144 may be fixedly attached to surface 120 of the head restraint 112 such that the arm 144 is fixed for rotation with the head restraint 112.

The arm 144 may include a reaction surface 153 that is slidably engaged with cam surface 150 such that rotation of the cam 142 causes the reaction surface 153 of the arm 144 to traverse the cam surface 150. The cam surface 150 may include a varying thickness such that as the cam 142 is rotated relative to the housing 114, a force is applied to the arm 144, thereby causing the arm 144 to rotate relative to the housing 114. Rotation of the arm 144 may cause concurrent rotation of the head restraint 112 as the arm 144 may be fixed to surface 120. Therefore, rotation of the cam 142 may provide angular adjustment of the head restraint 112 relative to the housing 114, similar to the operation described above regarding head restraint assembly 14.

Figure 13:
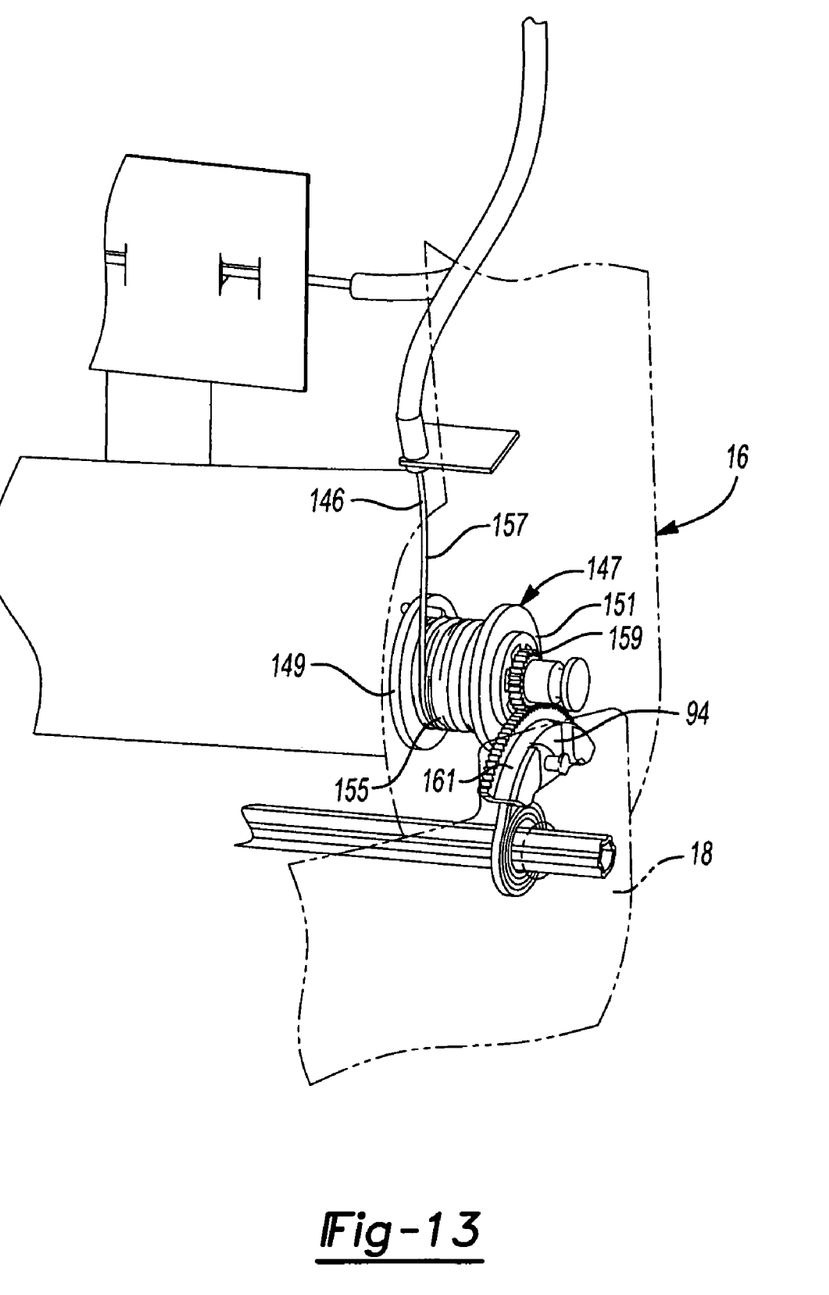
FIG. 13 is a perspective view showing the spool of the head restraint assembly of FIG. 9.

With additional reference to FIG. 13, spool 147 may be rotatably mounted to frame side support 22. Spool 147 may include first and second ends 149, 151 and a number of cable grooves 155. A second end 157 of cable 146 may be fixed to spool 147 near first end 149. Cable 146 may generally be aligned with cable grooves 155. Spool 147 may include a gear portion 159 near second end 151. The gear portion 159 may be a generally circular member having a plurality of teeth 161 configured to drive rotation of spool 147 when engaged by a second gear.

Spool 147 can be driven by a larger diameter stationary gear 94 as described above regarding spool 56. Operation of head restraint assembly 110, and specifically adjustment mechanism 115 may be generally similar to that described above regarding head restraint assembly 14.

The actuation mechanism 117 may include a pair of gears 152, a pair of release rods 154, a pair of springs 156, a load plate 158, and a cable 160. The housing 114 may rotatably support the gears 152 by a pair of pivots 162. The pivots 162 may be fixedly attached to the respective gears 152 and thus rotate with the gears 152 relative to the housing 114. The slots 140 may matingly receive gears 152 such that the gears 152 are permitted to move relative to the rack 116 generally within each slot 140. The release rods 154 may be rotatably supported by each pivot 162 and fixedly attached to each spring 156.

The springs 156 may be rotatably supported by each pivot 162 and may be moveable between a locked position and an unlocked position through actuation of the release rods 154 relative to the housing 114. The springs 156 may normally be in the locked position, wherein the bias of each spring 156 constricts each spring 156 about each pivot 162, respectively, thereby restricting rotation of the pivots 162 relative to the housing 114. In this position, the pivots 162 (and thus the gears 152) may be restricted from rotating within the slots 140 and may therefore fix the position of the housing 114 relative to the rack 116. In the unlocked position, a force is applied against an end 163 of each spring 156 via release rods 154. This force may relieve the frictional engagement between the springs 156 and pivots 162, thereby permitting rotation of the pivots 162 relative to the housing 114. Therefore, movement of the gears 152 within the slots 140 may be permitted when the springs 156 are in the unlocked position or when a sufficient force is applied to the housing 114 to overcome the bias of each spring 156, as discussed below.

Figure 15:
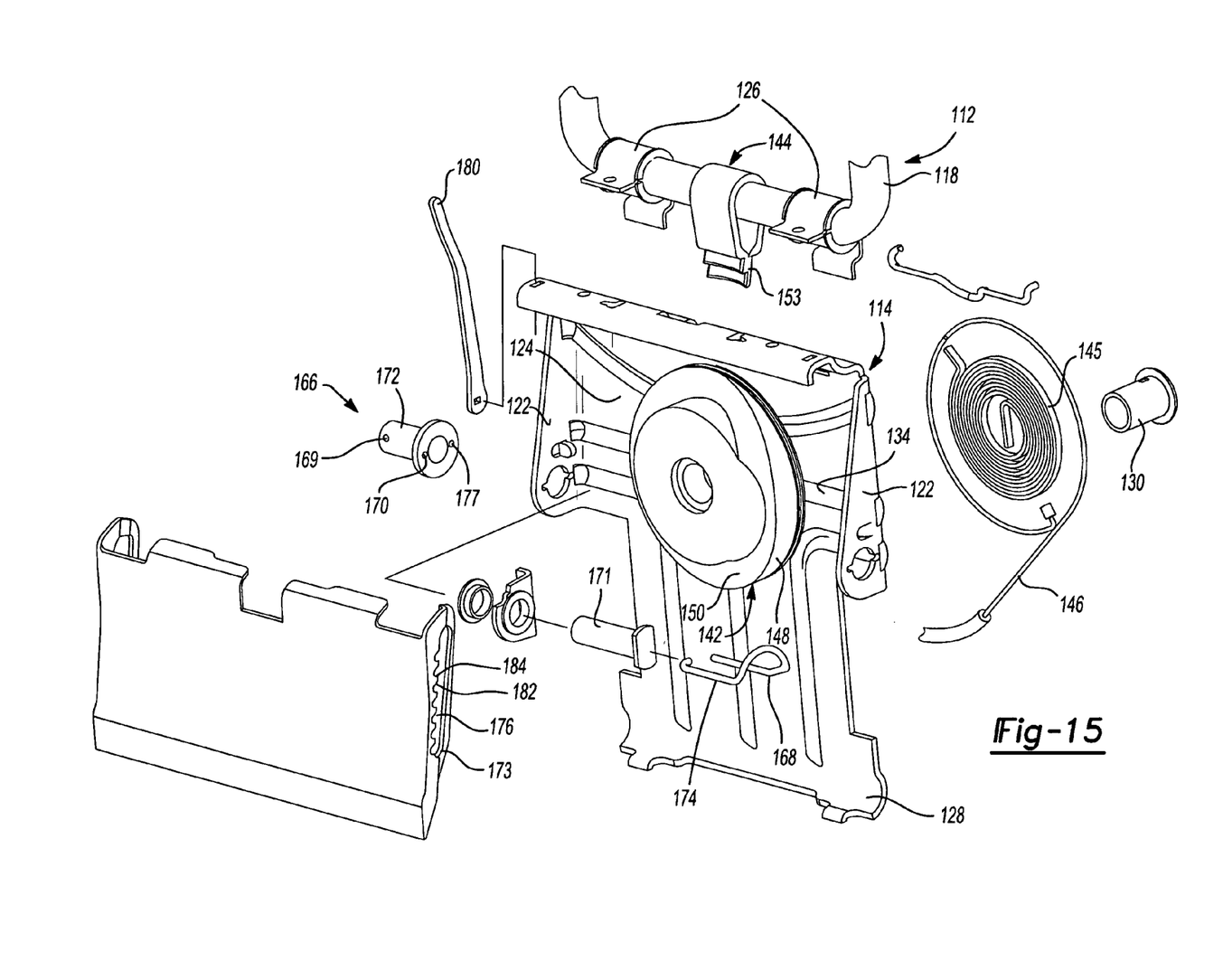
FIG. 15 is an exploded view of a head restraint assembly having an alternate actuation mechanism.

With additional reference to FIG. 15, an alternate actuation mechanism 166 is shown. Actuation mechanism 166 may be generally similar to actuation mechanism 117 with the exception of pivots 162, gears 152 and springs 156. Pivots 162 may be replaced by first and second pivot members 171, 172. First pivot members 171 may extend into second pivot members 172. In place of gears 152 and springs 156, actuation mechanism 166 may include spring pins 168. Spring pins 168 can generally pass through apertures 169, 170, 177 in second pivot members 172. Second pivot members 172 may be non-rotatably fixed to housing 114. Slots 173 may engage spring pins 168 and second pivot members 172 in a manner generally similar to that mentioned above regarding gears 152. An engagement portion 174 of spring pin 168 may engage recessed portions 176 on slot 173. Recessed portions 176 may include an upwardly ramped leading edge 182 and an outwardly extending engagement edge 184, thereby locking pivots 172, and therefore housing 114 in a given position when pivots pass leading edge 182. The spring pins 168 may be released by actuation of release rod 180 against the bias of engagement portion 174, thereby urging engagement portion 174 away from recessed portions 176. With the exception of the features previously mentioned, operation of actuation mechanism 166 is generally similar to actuation mechanism 117. Therefore, only operation of actuation mechanism 117 will be discussed below.

Referring back to FIGS. 9–12, load plate 158 may be a plastic cross member and may be in communication with the housing 114 via cable 160 such that when a sufficient force is applied to the load plate 158, the housing 114 may be slidable relative to the rack 116. Specifically, the cable 160 may be fixedly attached to the load plate 158 at one end and fixedly attached to a crossbar 164 at a second end. The lower bracket 128 of the housing 114 may rotatably support the crossbar 164 such that as a force is applied to the cable 160 via load plate 158, the crossbar 164 is rotated and translates the housing 114, and thus the head restraint 112, relative to the rack 116.

The force applied to the load plate 158 may be sufficient to overcome the bias of each spring 156, thereby permitting rotation of the gears 152 within each slot 140 and thus, upward and forward movement of the head restraint 112 relative to the rack 116. It should be noted that the springs 156, in combination with each gear 152, may prevent the housing 114 from moving downward and rearward relative to the rack 116 once the head restraint 112 is in the forward position (i.e., due to the interaction between the slots 140, gears 152, and springs 156). At this point, the only way to return the head restraint 112 to a reclined position relative to the rack 116 may be to actuate rods 154 to release the force applied to the pivots 162 by springs 156. Once the force of the springs 156 is released, the housing 114 may be permitted to slide relative to the rack 116 and return the head restraint 112 to the reclined position. It is understood that while housing 114, rack 116, and actuation mechanism 117 have been described with respect to head restraint assembly 110, they are equally applicable for combination with head restraint assembly 14.

Figure 14:
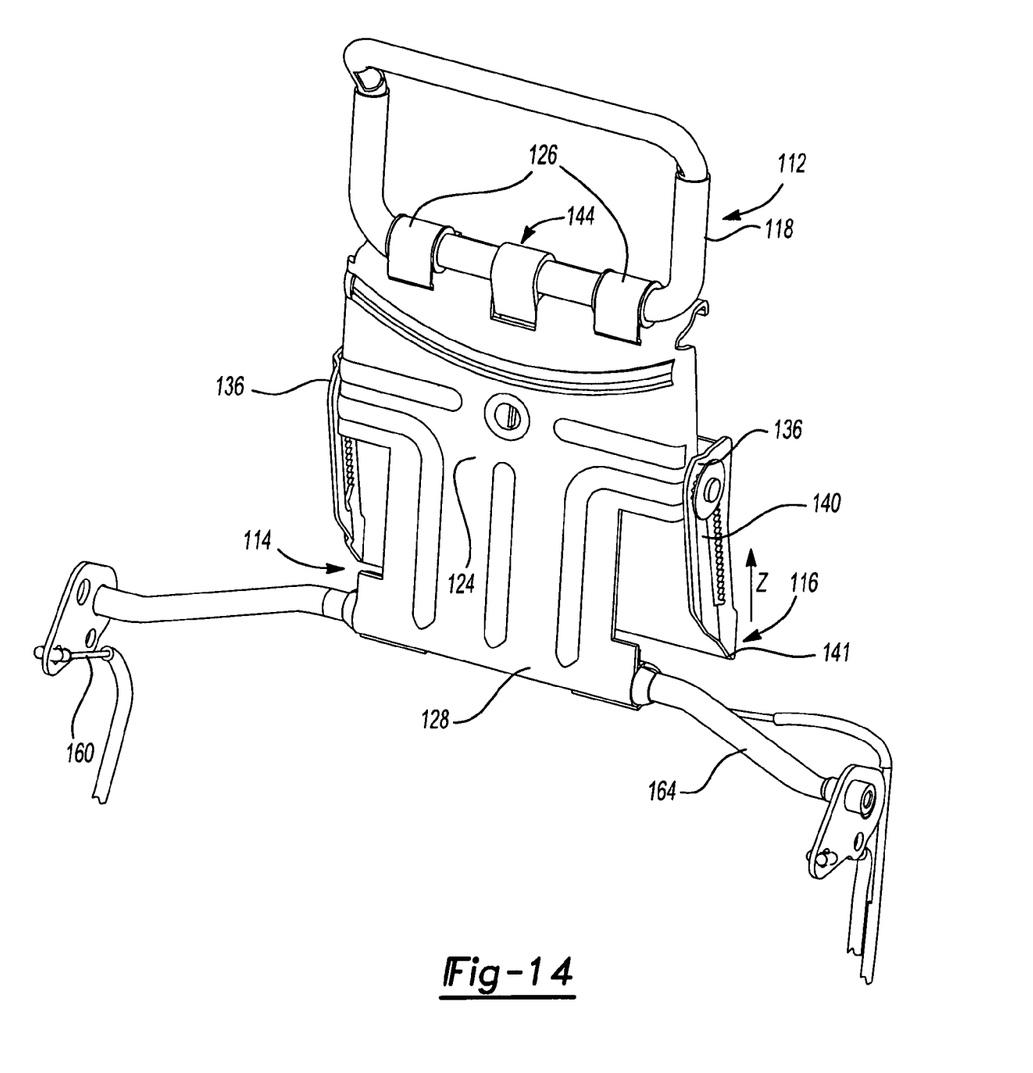
FIG. 14 is a perspective view of the front of the head restraint assembly of FIG. 9 with the housing moved to a second position.

During an impact event, an occupant may generally be caused to apply a force to the seat back 96 due to the forces associated with the event. The force applied to the seat back 96 and foam may be transmitted to the seat (frame 12), foam and load plate 158, thereby causing the load plate 158 to deflect. Deflection of the load plate 158 may cause a force to be applied to cable 160 and thus may cause the crossbar 164 to rotate relative to the seat frame 12. Sufficient rotation of the crossbar 164 relative to the seat frame 12 may cause the gears 152 to translate upward within slots 140 from a first position (shown in FIG. 10) to a second position (shown in FIG. 14), due to the generally curved shape of the crossbar 164.

The slots 140 may be formed at an angled relationship to the rack 116 such that as the gears 152 traverse each slot 140, the head restraint 112 and housing 114 not only move upwardly in a direction Z (FIG. 14) but also move forward. As a result, head restraint 112 may be in close proximity to the occupant's head shortly after initiation of the event. It should be noted that once the head restraint 112 is in the forward position, the gears 152 may be prevented from traversing the slots 140 due to the relationship between the gears 152, slots 140, and springs 156, as previously discussed. As previously mentioned, similar results may be achieved by the design shown in FIG. 15. Spring pins 168 may engage recessed portions 176 on slot 173 as housing 114 is forced upward. The angled features of recessed portions 176 may allow upward travel of spring pins 168, but may generally prevent downward travel.

The present disclosure is therefore capable of providing angular adjustment of a head restraint 112 relative to a seat back 96 during normal use of the seat and also to automatically position the head restraint 112 in close proximity to an occupant's head during an impact event.

The disclosure is merely exemplary in nature and, thus, variations that do not depart from the gist of the disclosure are intended to be within the scope of the disclosure. Such variations are not to be regarded as a departure from the spirit and scope of the disclosure.

What is claimed is:

1. A head restraint assembly for a seat assembly including a seat back and a seat bottom, the head restraint assembly comprising:

a headrest supported by the seat back and rotated relative to the seat back in a first direction and a second direction when the seat back is rotated relative to the seat bottom, the direction of rotation of said headrest dependent on the position of the seat back; and an actuation assembly associated with said headrest and the seat back and selectively moving said headrest relative to the seat back in a third direction and a fourth direction in response to a force exerted on the seatback.

2. The head restraint assembly of claim 1, wherein one of said first direction and said second direction is opposite to rotation of the seat back.

3. The head restraint assembly of claim 1, wherein one of said first direction and said second direction is the same direction as the direction of rotation of the seat back.

4. The head restraint assembly of claim 1, wherein movement of said headrest in said third direction includes movement of said headrest away from the seat back.

5. The head restraint assembly of claim 1, wherein movement of said headrest in said fourth direction includes rotation of said head restraint relative to the seat back.

6. The head restraint assembly of claim 1, further comprising a cam rotatably mounted to the seat back and including an engagement surface causing rotation of said head restraint in one of said first direction and said second direction when said cam is rotated relative to the seat back.

7. The head restraint assembly of claim 6, further comprising an engagement arm having a first portion coupled to said headrest and a second portion in communication with said engagement surface of said cam.

8. The head restraint assembly of claim 6, wherein said engagement surface varies in axial extent in a direction generally along an axis of rotation of said cam.

9. The head restraint assembly of claim 6, further comprising an actuation cable having a first end coupled to said cam to rotate said cam relative to the seat back in response to rotation of the seat back.

10. The head restraint assembly of claim 9, further comprising a rotatably mounted spool coupled to a second end of said cable.

11. The head restraint assembly of claim 10, wherein said spool includes a gear portion having a plurality of teeth configured to engage a driving gear to selectively inhibit rotation of said spool relative to the seat back.

12. The head restraint assembly of claim 1, wherein said actuation assembly includes a rack attached to the seat back and a housing plate slidably coupled to said rack and supporting said headrest.

13. The head restraint assembly of claim 12, further comprising a cam rotatably mounted to said rack and causing said headrest to rotate in one of said first direction and said second direction when said cam rotates relative to said rack.

14. The head restraint assembly of claim 12, further comprising a crossbar rotatably attached to the seat back and coupled to said housing plate, said crossbar causing said housing plate to move in said third and fourth directions relative to said rack in response to said force being applied to the seat back.

15. The head restraint assembly of claim 14, further comprising a load plate associated with the seat back and operable to rotate said crossbar relative to the seat back in response to said force being applied to the seat.

16. The head restraint assembly of claim 12, wherein said rack includes a slot interacting with said housing plate to cause said housing plate to move in said third direction relative to said rack in response to said force being exerted on the seat back.

17. A seat assembly comprising:
a seat bottom;
a seat back pivotally coupled to said seat bottom;
a headrest supported by said seat back and rotated relative to said seat back in a first direction and a second direction when said seat back is rotated relative to said seat bottom, the direction of rotation of said headrest dependent on the position of said seat back; and
an actuation assembly associated with said headrest and said seat back and selectively moving said headrest relative to said seat back in a third direction and a fourth direction in response to a force exerted on said seatback.

18. The seat assembly of claim 17, wherein one of said first direction and said second direction is opposite to rotation of said seat back.

19. The seat assembly of claim 17, wherein one of said first direction and said second direction is the same direction as the direction of rotation of said seat back.

20. The seat assembly of claim 17, wherein movement of said headrest in said third direction includes movement of said headrest away from said seat back.

21. The seat assembly of claim 17, wherein movement of said headrest in said fourth direction includes rotation of said head restraint relative to said seat back.

22. The seat assembly of claim 17, further comprising a cam rotatably mounted to said seat back and including an engagement surface causing rotation of said head restraint in one of said first direction and said second direction relative to said seat back.

23. The seat assembly of claim 22, further comprising an engagement arm having a first portion coupled to said headrest and a second portion in communication with said engagement surface of said cam.

24. The seat assembly of claim 22, wherein said engagement surface varies in axial extent in a direction generally along an axis of rotation of said cam.

25. The seat assembly of claim 22, further comprising an actuation cable having a first end coupled to said cam to rotate said cam relative to said seat back in response to rotation of said seat back.

26. The seat assembly of claim 25, further comprising a rotatably mounted spool coupled to a second end of said cable.

27. The seat assembly of claim 26, wherein said spool includes a gear portion having a plurality of teeth configured to engage a driving gear to selectively inhibit rotation of said spool relative to said seat back.

28. The seat assembly of claim 27, wherein said actuation assembly includes a rack attached to said seat back and a housing plate slidably coupled to said rack and supporting said headrest.

29. The seat assembly of claim 28, further comprising a cam rotatably mounted to said rack and causing said headrest to rotate in one of said first direction and said second direction when said cam rotates relative to said rack.

30. The seat assembly of claim 28, further comprising a crossbar rotatably attached to said seat back and coupled to said housing plate, said crossbar causing said housing plate to move in said third and fourth directions relative to said rack in response to said force being applied to said seat back.

31. The seat assembly of claim 30, further comprising a load plate associated with said seat back and operable to rotate said crossbar relative to said seat back in response to said force applied to the seat.

32. The seat assembly of claim 28, wherein said rack includes a slot interacting with said housing plate to cause said housing plate to move relative to said rack in response to said force being exerted on said seat back.

* * * * *